United States Patent
Murai et al.

[11] Patent Number: 6,057,515
[45] Date of Patent: May 2, 2000

[54] CONTROL APPARATUS FOR POWDER FEEDER

[75] Inventors: Katsumi Murai; Mamoru Tateishi; Masaki Ikeya, all of Obu, Japan

[73] Assignee: Aisan Kogyo Kabushiki Kaisha, Japan

[21] Appl. No.: 09/307,796

[22] Filed: May 10, 1999

Related U.S. Application Data

[63] Continuation-in-part of application No. 08/949,037, Oct. 10, 1997, abandoned, and a continuation-in-part of application No. 08/855,357, May 13, 1997, Pat. No. 5,938,075.

[30] Foreign Application Priority Data

May 17, 1996 [JP] Japan ................................ 8-122092
Oct. 11, 1996 [JP] Japan ................................ 8-269650

[51] Int. Cl.$^7$ .............................. B67B 7/00; B67D 5/08; H01L 41/08; G01G 13/02
[52] U.S. Cl. .............................. 177/116; 177/121; 222/1; 222/55; 222/200; 310/316; 73/1.36; 702/45; 702/100
[58] Field of Search .............................. 73/1.16, 1.36; 702/45, 46, 48, 100; 222/196, 200, 203, 1, 55; 310/316, 317; 366/116; 177/116, 121; 141/83

[56] References Cited

U.S. PATENT DOCUMENTS

| | | | |
|---|---|---|---|
| 4,524,886 | 6/1985 | Wilson et al. .............................. | 222/55 |
| 4,714,005 | 12/1987 | Leemhuis .................................. | 702/45 |
| 4,893,262 | 1/1990 | Kalata ....................................... | 177/59 |
| 4,954,975 | 9/1990 | Kalta ......................................... | 177/59 |
| 5,111,683 | 5/1992 | Fond ........................................ | 73/1.36 |
| 5,684,246 | 11/1997 | Korpi ....................................... | 73/1.36 |
| 5,739,622 | 4/1998 | Zaitsu ...................................... | 310/316 |
| 5,906,294 | 5/1999 | Ikeya et al. ............................... | 222/55 |
| 5,917,266 | 6/1999 | Murai et al. ............................. | 310/316 |
| 5,920,004 | 7/1999 | Gottshall et al. ........................ | 73/1.36 |
| 5,938,075 | 8/1999 | Murai et al. .............................. | 222/1 |
| 5,995,909 | 11/1999 | Bretmersky et al. ..................... | 702/45 |

*Primary Examiner*—Randy W. Gibson
*Attorney, Agent, or Firm*—Finnegan, Henderson, Farabow, Garrett & Dunner, L.L.P.

[57] ABSTRACT

Disclosed is the powder feeder in which the duty ratio $X_T$ corresponding to the target feed amount $Q_T$ is calculated on the basis of the calibration curve obtained by the feeder calibration which is conducted before the start of powder feed, and the powder P starts to be fed according to the duty ratio $X_T$, therefore, the actual feed amount can reach to the target feed amount $Q_T$ in a short time (within the time $T_1$) from the start of powder feed, and the powder P can be fed while controlling the actual feed amount with high accuracy, and further the powder P can be precisely fed even in case of the short time feed for several seconds.

16 Claims, 10 Drawing Sheets

FIG.3
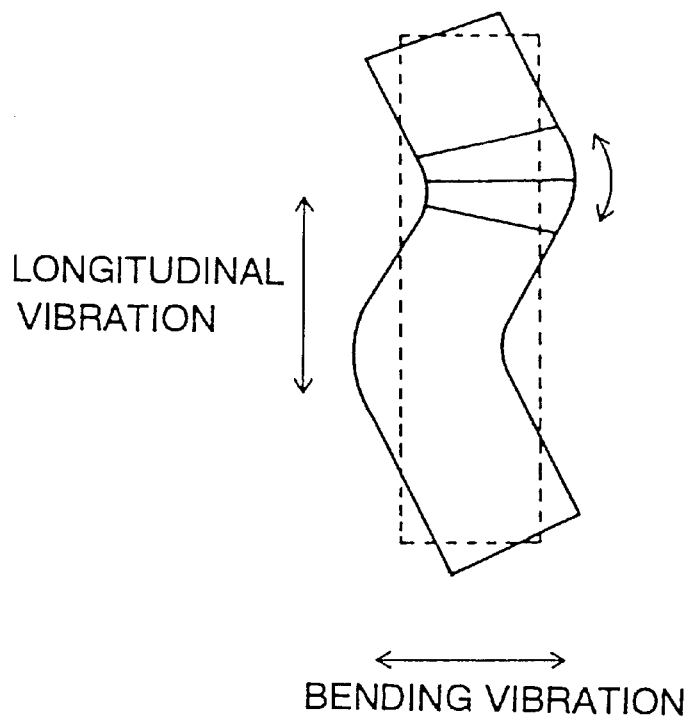
LONGITUDINAL VIBRATION
BENDING VIBRATION
FIG.4(a)    FIG.4(b)    FIG.4(c)    FIG.4(d)
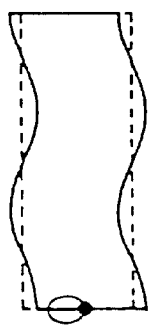   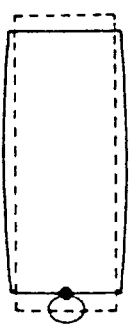   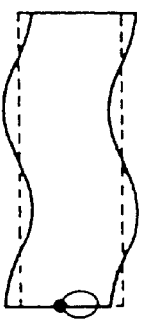   
$t = 0$    $t = \dfrac{1}{2}\pi$    $t = \pi$    $t = \dfrac{3}{2}\pi$

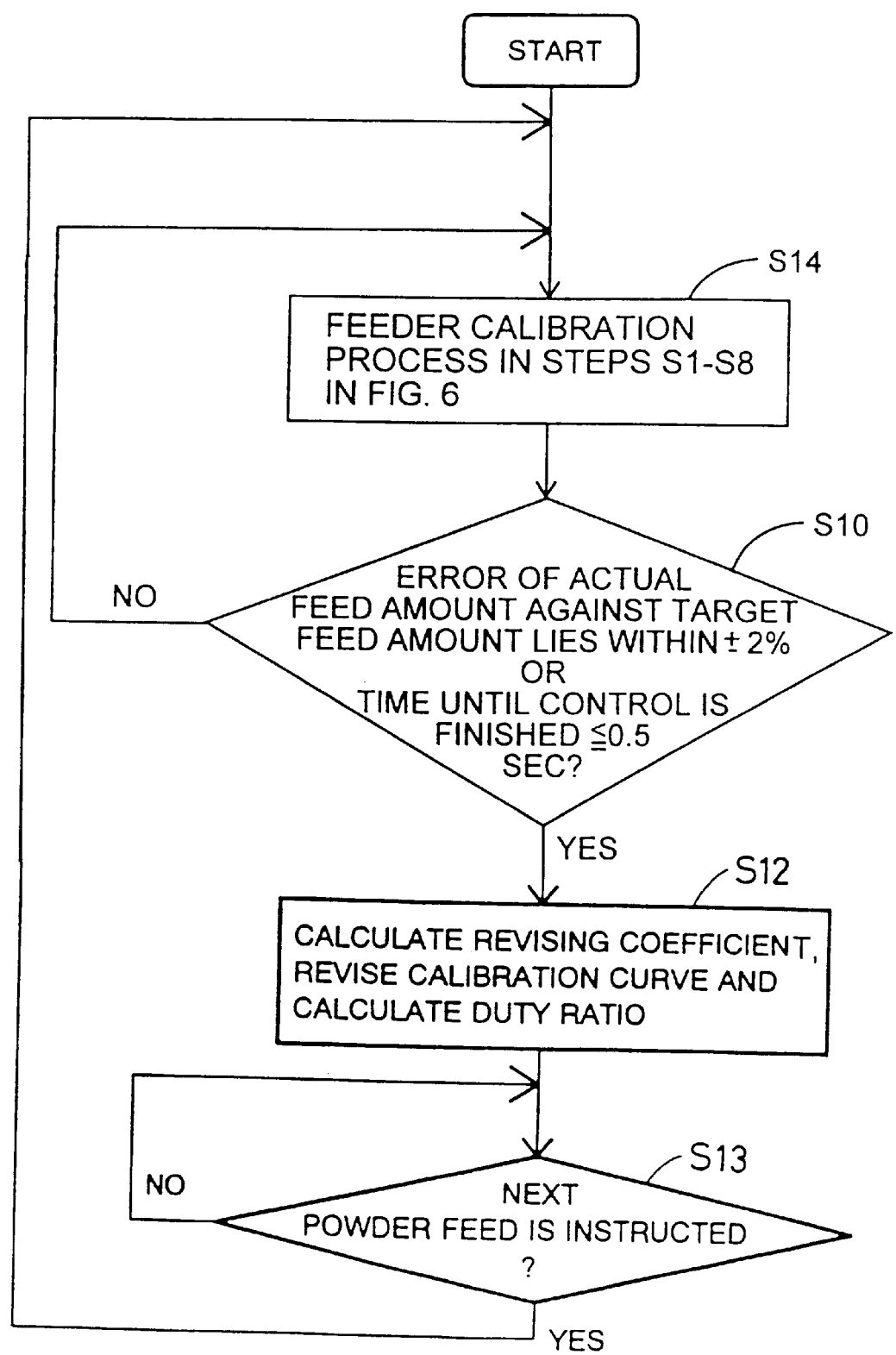

FIG.12
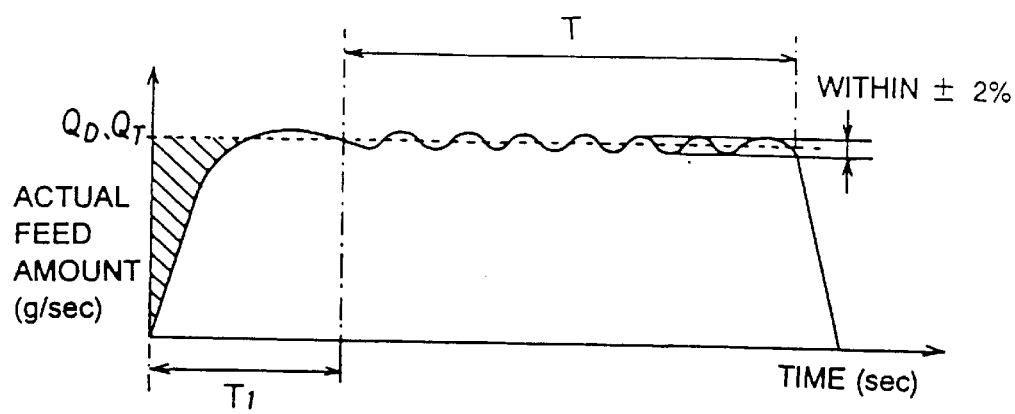
FIG.13  *PRIOR ART*
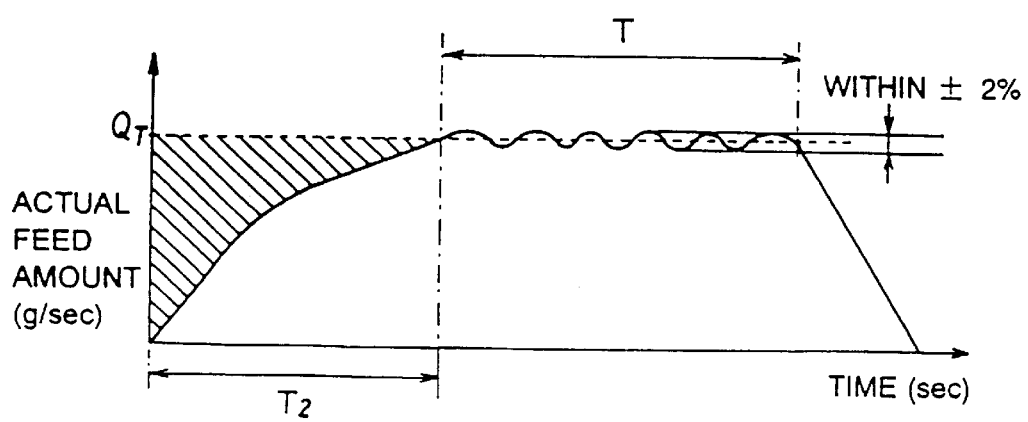

CONTROL APPARATUS FOR POWDER FEEDER

CROSS-REFERENCE TO RELATED APPLICATIONS

The present application is a continuation-in-part of U.S. application Ser. No. 08/949,037, filed Oct. 10, 1997, now abandoned, by the inventors Katsumi Murai, now ABN Mamoru Tateishi and Masaki Ikeya, adding subject matter from U.S. application Ser. No. 08/855,357, filed May 13, 1997, now U.S. Pat. No. 5,938,075, also by the inventors Katsumi Murai, Mamoru Tateishi and Masaki Ikeya, now U.S. Pat. No. 5,93. The complete disclosures of both the co-pending applications are incorporated by reference in this continuation-in-part application.

BACKGROUND OF THE INVENTION

1. Field of the Invention

The present invention relates to a control apparatus for driving a powder feeder, through which feed amount of powder can be precisely controlled within a short time from the start of powder feed, and relates to a powder feeder in which such control apparatus installed.

2. Description of Related Art

It is conventionally well-known a powder feeder in which an ultrasonic motor having an ultrasonic vibrator is utilized. In the ultrasonic vibrator, it is used a piezoelectric element which is mechanically deformed when electrical energy is applied thereto. The powder feeder feeds the powder by driving the ultrasonic vibrator through applying a driving voltage with a resonance frequency and producing mechanical vibration in the ultrasonic vibrator through the piezoelectric element. That is, in the powder feeder, if an AC driving voltage with the resonance frequency is applied to the ultrasonic motor which is constructed so as to simultaneously produce axial vibration (longitudinal vibration) and bending vibration, elliptic oscillation is produced at the top end of the vibrator. Based on this, a feed pipe is attached at the top end of the vibrator, and the powder supplied into the feed pipe is fed in the certain direction on the basis of the elliptic oscillation of the vibrator.

The feed amount of the powder is controlled as follows. Namely, the driving voltage is intermittently applied to the ultrasonic motor. At that time, output of the driving voltage to the ultrasonic motor is changed by (changing proportion of the driving voltage per one cycle thereof (duty ratio). Thereby, the feed amount of the powder is controlled. For example, in order to perform such control, the output from a resonance frequency oscillation circuit which is oscillating with the resonance frequency and the output from the duty ratio control clock generation means for changing the duty ratio are supplied to an AND (product) circuit to generate the product, and the product output is amplified and applied to the vibrator.

Further, in the powder feeder, feedback control is conducted by using the control system shown in FIG. 5, to improve accuracy of feed amount control of the powder. In the control system, powder amount is detected by a load cell acting as a load sensor and the sensor output signal is amplified in a load cell amplifier. The amplified output signal is fed back to an A/D converter, thereafter the output signal is sampled by a microcomputer system as duty ratio control means through the A/D converter. In the microcomputer system, a duty ratio clock signal is calculated on the basis of the amplified output signal and a drive circuit receives the duty ratio clock signal. Thereafter, a driving voltage signal is applied to the ultrasonic motor, thereby the ultrasonic motor is driven. In this way, since the microcomputer system calculates the optimum duty ratio based on the output signal from the load cell, the feed amount of the powder can be properly controlled.

However, in the above powder feeder, though the feedback control is conducted so as to coincide the actual feed amount of the powder with the target feed amount, there is a problem that it takes a long time until the actual feed amount becomes the target feed amount. For instance, as shown in FIG. 13, it takes the time $T_2$ (several seconds) including the response time of the control system until the actual feed amount becomes the target feed amount $Q_T$ from the start of powder feeding. Therefore, the actual feed amount becomes very unstable and thus the powder cannot be supplied with the target feed amount $Q_T$ during it passes several seconds from the start of powder feeding. The reason is due to that feed control of the powder until the feed amount reaches the target feed amount $Q_T$ is conducted by gradually increasing the duty ratio every time that the powder feed is done.

Thus, at the initial of the powder feed, the actual feed amount largely deviates from the target feed amount $Q_T$, as a result, the powder cannot be precisely fed with the predetermined amount. Due to this, during a short time, for example, several seconds from the start of powder feed, there exists a large error between the actual feed amount and the target feed amount $Q_T$, and there remains a problem that the powder cannot be precisely fed with a predetermined amount.

Further, since flow characteristic of the powder is different due to fluctuation in properties or lots of the powder, the feed accuracy of the powder is seriously influenced by such fluctuation. Thus, in order to retain the feeding accuracy, it is necessary to conduct the feeder calibration every time properties or lots of the powder change, thus it is very troublesome.

SUMMARY OF THE INVENTION

Accordingly, it is an object of the present invention to overcome the above mentioned problems and to provide a control apparatus for driving a powder feeder, through which feed amount of powder can be precisely controlled within a short time from the start of powder feed and it can remarkably improve efficiency of powder feeding, and to provide a powder feeder in which such control apparatus installed.

To accomplish the above objects, the present invention provides a control apparatus for a powder feeder which comprises a vibrator having a top end which oscillates with elliptic motion when applied a driving voltage with a resonance frequency, a powder feed path attached to the top end of the vibrator, a powder storing hopper for feeding the powder to the powder feed path, application means for applying the resonance frequency to the vibrator according to a duty ratio, and weight sensor means for detecting a weight of the powder in the powder storing hopper, the control apparatus comprising:

feeder calibration means for conducting feeder calibration before the powder feeder is used;

calibration curve preparing means for preparing a calibration curve based on the feeder calibration and for storing the calibration curve;

duty ratio calculation means for calculating the duty ratio corresponding to a target feed amount which is preset, based on the calibration curve prepared by the calibration curve preparing means; and drive means for starting drive of the vibrator based on the duty ratio calculated by the duty ratio calculation means until a feed amount of the powder reaches to the target feed amount.

In the control apparatus, the vibrator oscillates with elliptic motion when the driving voltage is applied to the vibrator, thus, the powder feed path attached to the top end of the vibrator oscillates with elliptic motion similarly to the vibrator. At that time, the powder fed into the powder feed path from the powder storing hopper receives acceleration in the horizontal direction (in the direction perpendicular to the longitudinal vibration of the vibrator and in the direction parallel to the bending vibration direction of the vibrator) and is moved. Thus, the powder is fed.

In this case, since the driving voltage is applied to vibrator while conducting ON/OFF control of the driving voltage, the powder is fed during a period that the vibrator is driven. On the other hand, the powder is not fed during the driving voltage is not applied to the vibrator since the top end of the vibrator does not oscillate with elliptic motion.

Further, the duty ratio corresponding to the target feed amount is calculated by the duty ratio calculation means on the basis of the calibration curve which is prepared and stored in the calibration curve preparing means, and the drive means starts to drive the vibrator based on the calculated duty ratio until the feed amount of the powder reaches to the target feed amount. Thereby, the powder can be fed with high accuracy so that the feed amount immediately becomes equal to the target feed amount within one second.

Further, the present invention provides a control apparatus for a powder feeder which comprises a vibrator having a top end which oscillates with elliptic motion when applied a driving voltage with a resonance frequency, a powder feed path attached to the top end of the vibrator, a powder storing hopper for feeding the powder to the powder feed path, application means for applying the resonance frequency to the vibrator according to a duty ratio, and weight sensor means for detecting a weight of the powder in the powder storing hopper, the control apparatus controlling the powder feeder in an initial feed control region and a feedback control region after the initial control region, the control apparatus comprising:

feeder calibration means for conducting feeder calibration before the powder feeder is used;

calibration curve preparing means for preparing a calibration curve based on the feeder calibration and for storing the calibration curve;

measurement means for measuring a steady value of a feed amount in the feedback control region at the previous feed time;

coefficient calculation means for calculating a revising coefficient by comparing the steady value with a feed amount at the present feed time;

revising means for revising the calibration curve according to the revising coefficient;

duty ratio calculation means for calculating the duty ratio corresponding to a target feed amount which is preset, based on the revised calibration curve by the revising means; and drive means for starting drive of the vibrator based on the duty ratio calculated by the duty ratio calculation means until the feed amount of the powder reaches to the target feed amount.

In the control apparatus, the calibration curve is prepared by the calibration curve preparing means during the feeder calibration, and the revising coefficient is calculated on the basis of the steady value of the feed amount in the feedback control region at the previous feed time, further the calibration curve is revised according to the revising coefficient. Further, the duty ratio corresponding to the target feed amount is calculated on the basis of the revised calibration curve, and the vibrator starts to be driven according to the calculated duty ratio, thereby powder feed starts. Thus, the actual feed amount of the powder can immediately reach to the target feed amount within one second, and the error between the feed amount and the target feed amount can be made smaller than that at the previous feed time since the calibration curve is revised every feed time, as a result, the powder can be fed with high accuracy.

Further, since the calibration curve is revised every feed time the optimum calibration curve can be automatically obtained even if the feeder calibration is not done when propertied or lots of the powder change, and since the calibration curve is revised every feed time the feed efficiency can be improved while feeding the powder with high accuracy.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the accompanying drawings, wherein :

FIG. 3 is a schematic view of the vibrator which shows vibration states when driven with the resonance frequency;

FIG. 4 is a schematic view of the vibrator which shows vibration states every ¼ cycle when driven with the resonance frequency;

FIG. 10 is graphs which show feed control slates in the powder feeder of the first embodiment, wherein

FIG. 11 is a flowchart when revising process of the calibration curve is conducted during the feed control of the powder in the powder feeder according to the second embodiment;

FIG. 12 is a graph which shows feed control state in the powder feeder of the second embodiment; and FIG. 13 is a graph which shows feed control state in the conventional powder feeder.

DETAILED DESCRIPTION OF THE PREFERRED EMBODIMENTS

Figure 1:
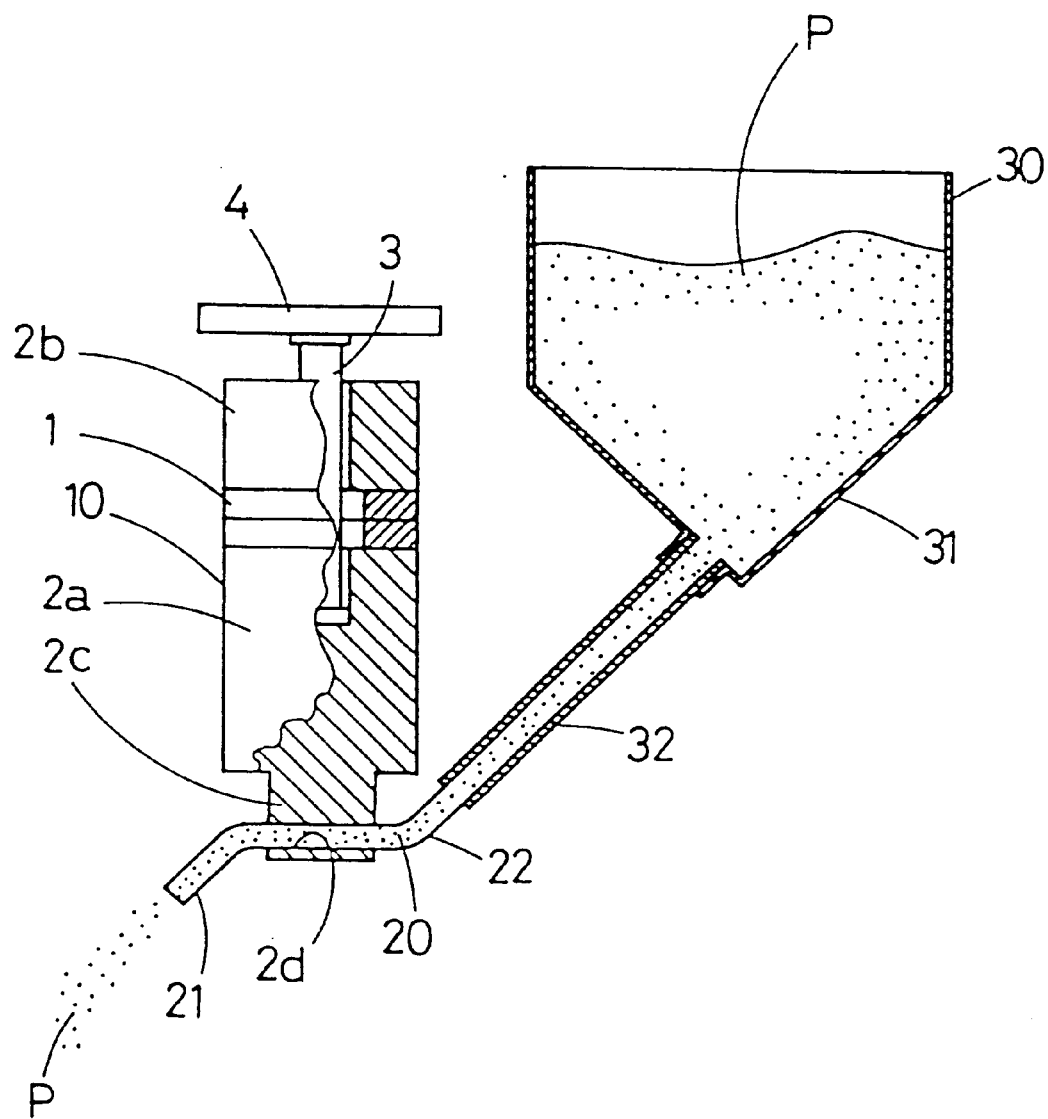
FIG. 1 is a partially sectional view which schematically shows a powder feeder according to the first embodiment of the present invention.

A detailed description of the first embodiment embodying the present invention will be given referring to the accompanying drawings. The structure of a powder feeder according to the first embodiment is shown in FIG. 1.

The vibrator 10 is a so-called linear type ultrasonic motor, two flat ring piezoelectric elements 1 are stacked with interposition of an electrode not shown in the figure, and placed between an approximately cylindrical metal horn 2a and an approximately hollow cylindrical metal back horn 2b. The vibrator 10 is fixed to a fixing member 4 with a bolt 3, which is fastened to the horn 2a at the one end, inserted through a through hole which extends through the back horn 2b and piezoelectric element 1 at the center.

The end 2c of the horn 2a is double flatted and provided with a through hole 2d for being inserted with a pipe as described hereinafter.

A powder feed pipe 20, in the inner part of which the powder circulates, is inserted and fixed to the through hole 2d. The end 21 of the powder feed pipe 20 locating in the left side of the figure is bent slightly downward to help powder P fed from the right side in the figure to drop from the end 21 of the pipe 20.

On the other hand, the other end 22 of the pipe 20 in the right side of the figure is bent slightly upward to help the powder P fed from a hopper body 30 to move to the left side in the figure.

The hopper body 30 is provided for storing the powder P and feeding slowly the powder P to the pipe 20, the bottom 31 has a funnel configuration. A tube 32 is connected to the bottom 31, and the other end of the tube 32 is connected to the end 22 of the powder feed pipe 20. Accordingly, the powder P charged in the hopper body 30 is fed to the pipe 20 through the tube 32. The tube 32 made of flexible material is selected so as not to suppress the vibration of the vibrator 10, in this embodiment a nylon tube is used.

Figure 2:
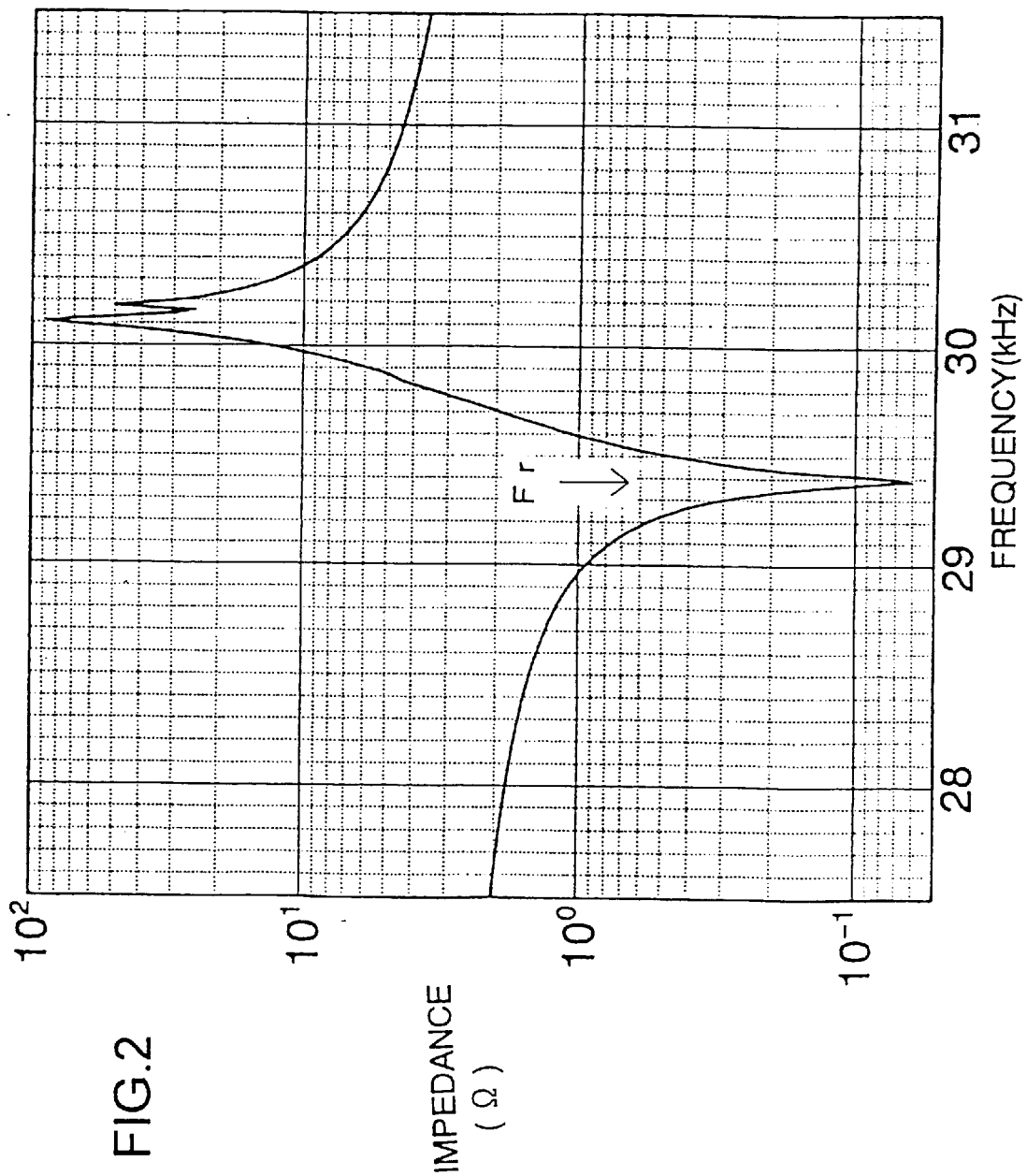
FIG. 2 is a graph which shows frequency characteristic of input impedance of a vibrator.
Figure 5:
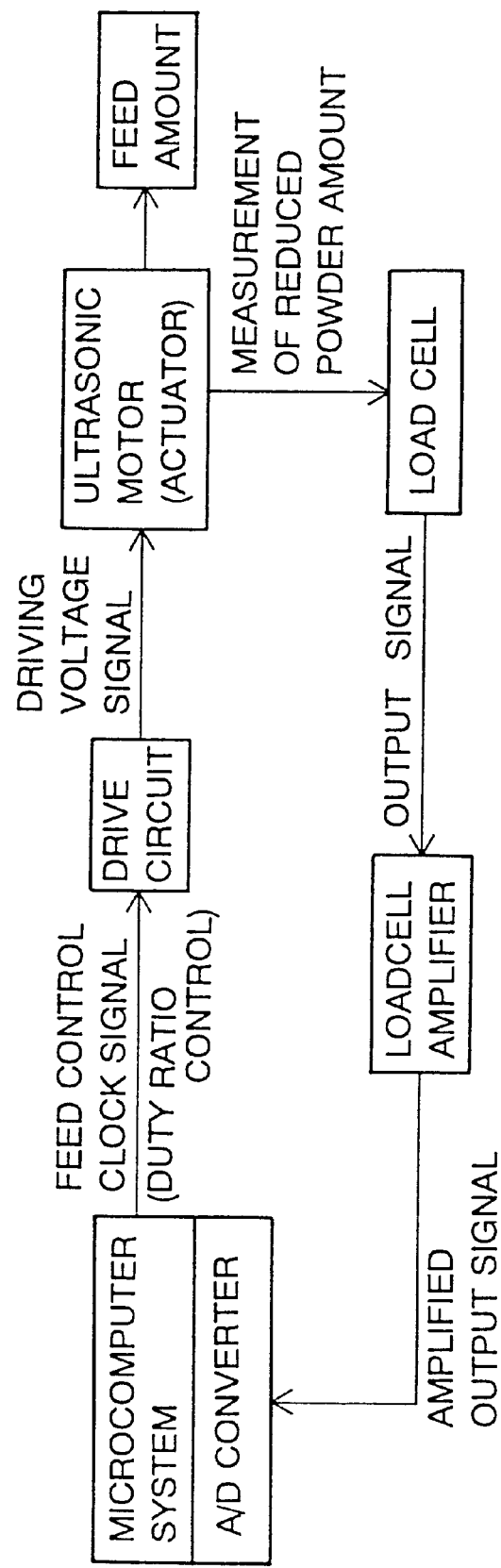
FIG. 5 is a block diagram which shows a system of the powder feeder.

FIG. 2 shows the result of measurement of the input impedance frequency characteristics of the vibrator 10 measured by means of an impedance analyzer. From this result, it is obvious that the resonance frequency Fr of the vibrator 10 is about 29.4 kHz. The driving with this resonance frequency Fr generates large vibration. On the other hand, the driving with frequency different from the resonance frequency, namely non-resonance frequency, generates scarce vibration because driving energy can not enter due to high impedance. Thus, in the first embodiment, driving of the vibrator 10 is switched ON/OFF by alternately applying the resonance frequency and the non-resonance frequency. Here, the vibrator 10 can be switched ON/OFF even in a case that the driving voltage is not applied to the vibrator 10 in the period during which the non-resonance frequency is applied.

The vibration is described for the case than the vibrator 10 is vibrated with the resonance frequency.

The vibration of the piezoelectric element 1 with the resonance frequency causes the extension-shrinking deformation of the piezoelectric element 1, and the vibrator 10 is bending-vibrated as shown in FIG. 3. This bending vibration is a resultant motion of the extension shrinking motion in the vertical direction in the figure (longitudinal vibration) and bending vibration in the horizontal direction in the figure (flexing vibration).

One cycle of this vibration is described in detail in FIG. 4. For easy understanding of the motion of the end (the bottom end in the figure), the end is marked with a black dot at the center in FIG. 4. First at $t=0$ (FIG. 4(a)), the end (black dot) is bent so as to deviate to the right side. Next, after ¼ cycle at $t=\pi/2$ (FIG. 4(b)), the vibrator 10 shrinks and the end (black dot) deviates to the upper side. Further, at $t=\pi$ (FIG. 4(c)), the end (black dot) is bent so as to deviate to the left side. After the additional ¼ cycle at $t=3\pi/2$ (FIG. 4(d)), the vibrator 10 is extended, and the end (black dot) deviates to the lower side in the figure. Accordingly, the tracing of the black clot for one cycle shows an elliptic motion as shown in FIG. 4.

Therefore, a pipe is attached to this end and powder is fed in the pipe, then the powder is accelerated in the left direction with floating motion, and moved to the left side.

Further, the feed amount (predetermined feed amount) of the powder P is adjusted by changing the period to drive the vibrator 10 with the resonance frequency, that is, an active period. In particular, a timing clock (not shown) is provided for switching the driving frequency alternately between resonance frequency and non-resonance frequency. The period during which the vibrator is driven with the resonance frequency is referred to as an active period Ta, and the period while the vibrator is driven with non-resonance frequency is referred to as an inactive period Ti. Duty ratio is expressed as the proportion of resonance frequency driving period in a cycle and calculated by $Ta/(Ta+Ti)$. At this time, weight of the powder P in the hopper body 30 is detected by the load cell, and the output signal from the load cell is fed back to the microcomputer system. On the basis of the feedback signal the microcomputer system calculates the control signal to optimize the duty ratio and the control signal is output to the drive circuit. The drive circuit applies the driving voltage to the vibrator 10 for the time corresponding to the duty ratio, thereby the predetermined feed amount and the actual feed amount of the powder P is controlled. In the first embodiment, the microcomputer system acts as the application means, the feeder calibration means, the calibration curve preparing means, the duty ratio calculation means, the drive means and the feedback means, in claims.

In the control apparatus of the conventional powder feeder, as shown in FIG. 13, the actual feed amount cannot be stabilized to the target feed amount $Q_T$ until the time $T_2$ (several seconds) elapses from the start of powder feed. Therefore, the powder cannot be controlled with high accuracy during a short time, for example, several seconds from the start of powder feed. This is due to that feed control of the powder until the actual feed amount reaches the target feed amount $Q_T$ is conducted by gradually increasing the duty ratio every time that the powder feed is done.

In the first embodiment, it is used at the start of powder feed the calibration curve obtained by the feeder calibration which is normally done during the feedback control region T (later mentioned), thereby the powder P can be immediately supplied with the target feed amount from the start of powder feed. Thus, powder supply during a short time (several seconds) from the start of powder feed can be done with high accuracy.

Figure 6:
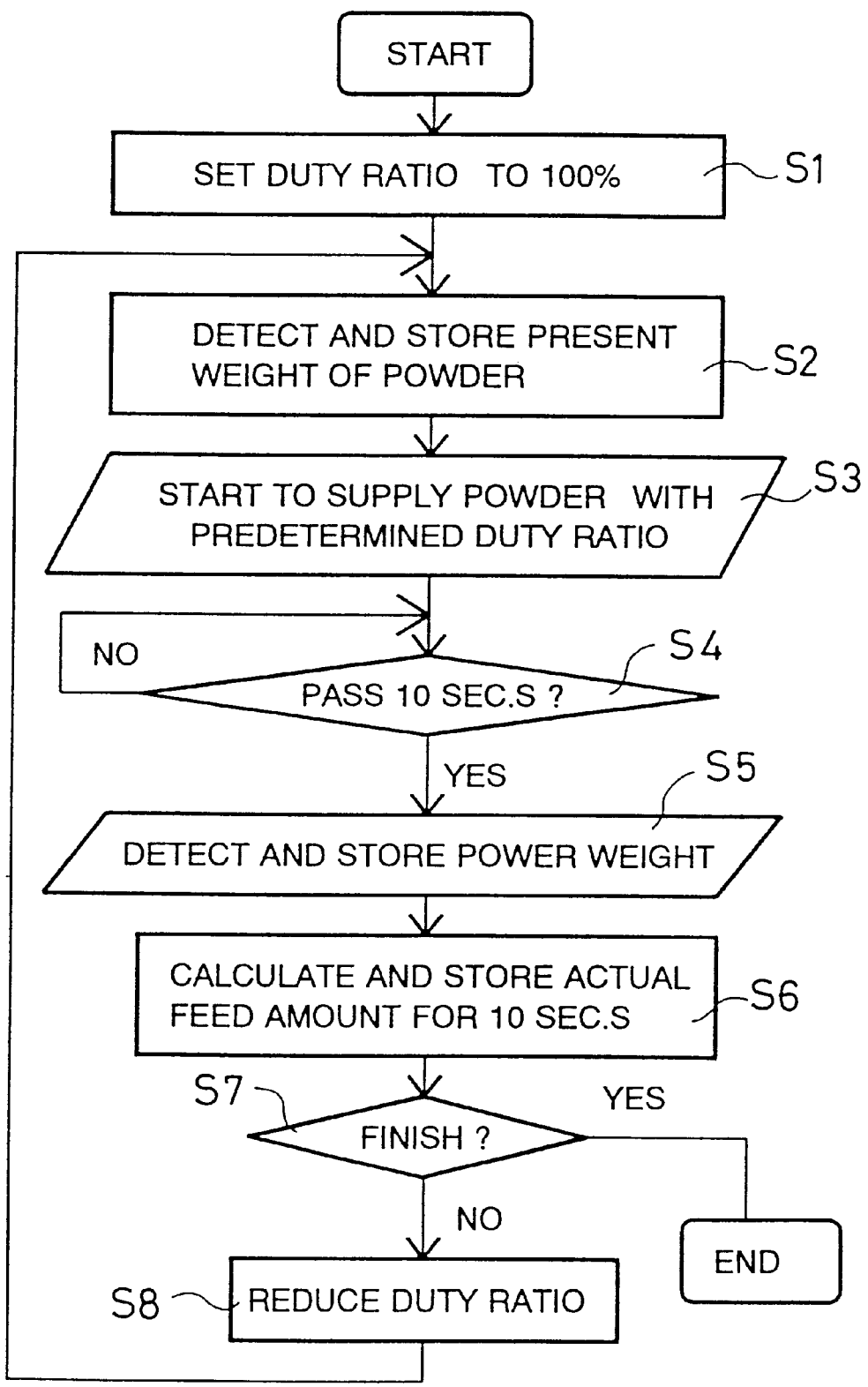
FIG. 6 is a flowchart when feeder calibration is conducted.
Figure 7:
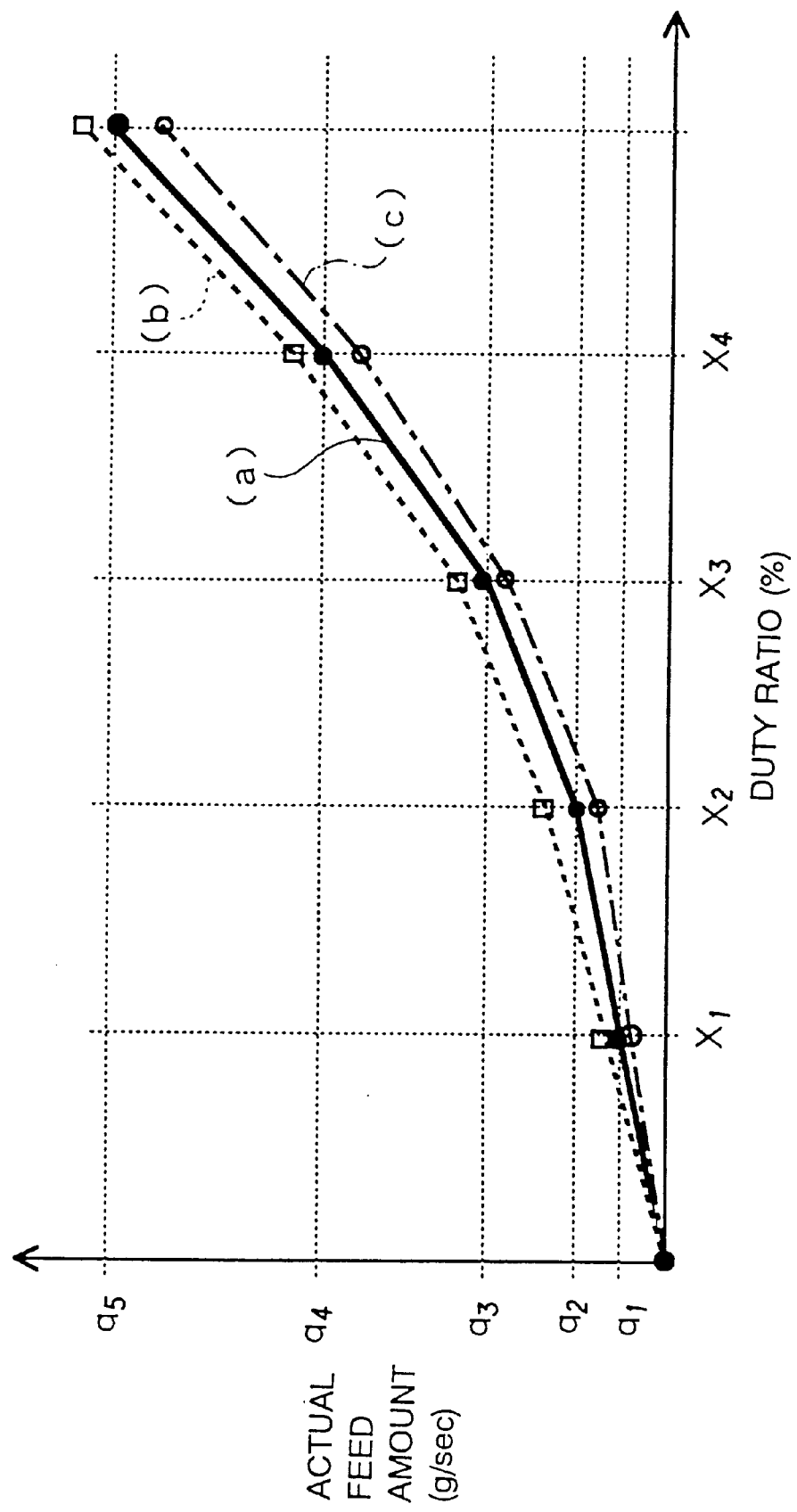
FIG. 7 is a graph which shows calibration curves representing a relationship between the actual feed amount and the duty ratio, the calibration curves being obtained by the feeder calibration.

Control method of the powder feeder will be described with reference to FIGS. 6–10. At first, the feeder calibration will be described with reference to FIGS. 6, 7. FIG. 6 shows the flowchart for the feeder calibration, and FIG. 7 shows the calibration curves obtained through the feeder calibration. The calibration curves are stored in a memory formed in the microcomputer system. The feeder calibration means the process to make a graph on the basis of a relationship between the duty ratio and the actual feed amount in some kind of powder.

In FIG. 6, the duty ratio is set to 100% in step 1 (abbreviated as "S" hereinafter). In S2, the present weight of the powder P in the hopper body 30 is detected by the load cell and stored in the memory.

Figure 8:
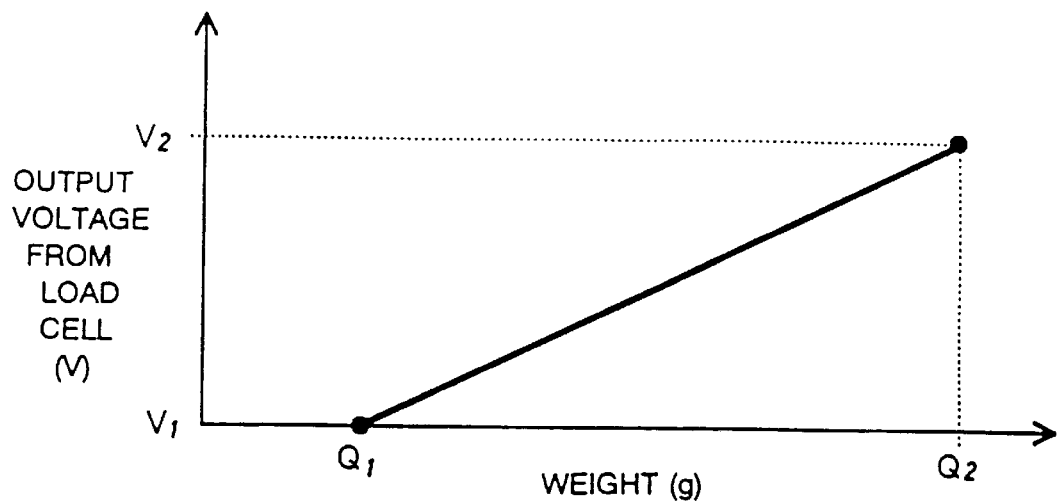
FIG. 8 is a graph which shows a weight calibration line representing a relationship between the output value (voltage value ) from the load cell and the weight value of powder feed amount.

Process conducted in S2 will be described with reference to FIG. 8. FIG. 8 shows the weight calibration line prepared in advance before the powder feeder is used. This weight calibration line indicates a relationship between the output voltage values $V_1, V_2, \ldots$ from the load cell and the weight values $Q_1, Q_2, \ldots$. When the output voltage values are input to the microcomputer system, the microcomputer system calculates the weight values based on the output voltage values according to the weight calibration line and stores in the memory.

In S3, the powder starts to be supplied by oscillating the vibrator 10 with a duty ratio. At that time, of course, such duty ratio is stored in the memory.

Here, the above duty ratio is predetermined. In FIG. 7, the predetermined duty ratio corresponds to $X_1, X_2, \ldots$, which has concretely has a value of 20%, 40%, ..., respectively.

Thereafter, it is judged in S4 whether it passes 10 seconds from the start of powder feed. If judged that 10 seconds pass (S4: YES), procedure shifts to S5. On the other hand, if judged that 10 seconds do not pass (S4: NO), the powder is continuously supplied with the predetermined duty ratio in S3.

In S5, the weight of the powder in the hopper body 30 is detected by the load cell and the detected weight value is stored in the memory. Process in S5 is conducted according to the same process in S2. In S6, it is calculated a weight change per unit time (second), that is, the actual feed amount (g/sec), based on the weight value obtained in S2 and the weight value obtained in S5, and the actual feed amount is stored in the memory. As understandable from the above, process in S6 corresponds to the calibration curve preparing means.

In S7, in the powder feeder in the first embodiment, to provide the calibration curves shown in FIG. 7, the step S1 to set the duty ratio to 100%, the steps S2, S5 and S6 for four points of the duty ratio X4(80%), X3(60%), X2(40%)), X1(20%) have to be carried out in sequence. The judgment in step S7 is then conducted for all the points of the duty ratio (100%, X4, X3, X2, X1) on the basis of whether or not calibration of the actual feed amount is finished.

In S8, since the calibration of the actual feed amount is successively conducted for the duty ratio of 100%, 80% (X4), 60%(X3), 40%(X2), 20%(X1), the actual feed amount corresponding to the duty ratio of 100% is first determined, and the feed amounts corresponding to the duty ratio reduced to 80%, 60%, 40%, 20% in order are determined.

Figure 9:
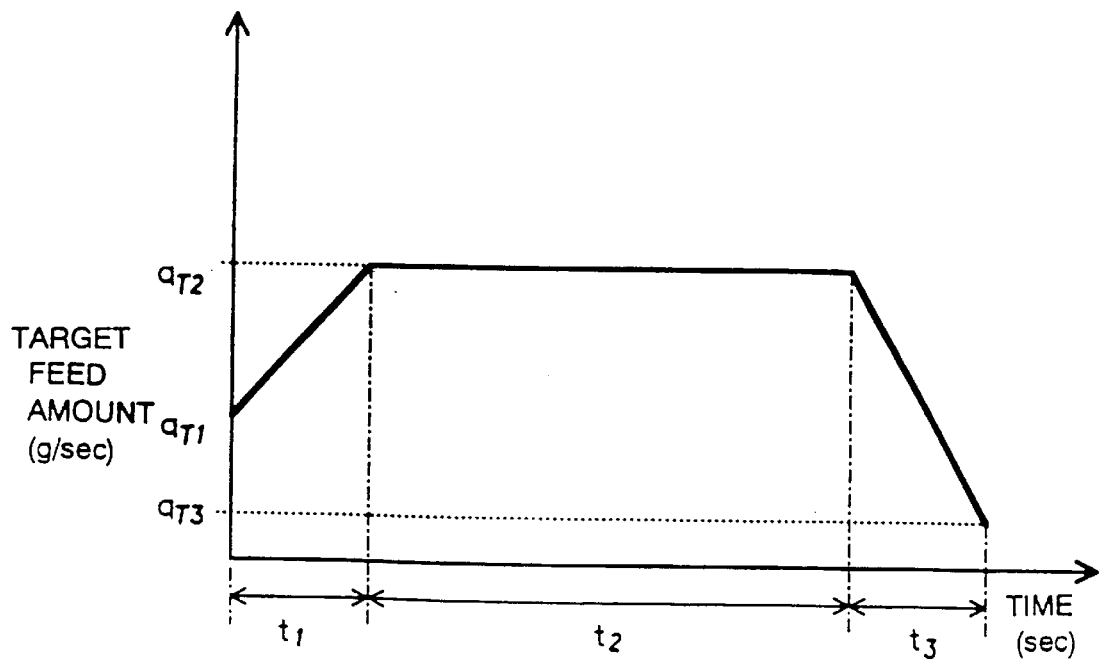
FIG. 9 is a graph which shows a feed pattern of the powder.

Control method of powder feed will be described with reference to FIGS. 9, 10. FIG. 9 indicates the feed pattern of the powder P, and FIG. 10 indicates the feed control states in the powder feeder, each state being represented by a relationship between the actual feed amount and time.

First, the feed pattern shown in FIG. 9 is set. In detail, the feed pattern is set by determining respectively the slope-up target feed amount $Q_{T1}$ at the start of powder feed, the steady actual feed amount $Q_{T2}$ the slope-down target feed amount $Q_{T3}$ at the end of powder feed, the slope-up time $t_1$, the steady feed time $t_2$ and the slope-down time $t_3$, and inputting those values to the microcomputer system. In FIG. 9, if $t_1=t_3=0$, the feed pattern becomes a rectangular wave form, and if $t_1=t_3>0$, the feed pattern becomes a trapezoidal wave form. In the feed pattern, though slopes are formed at the both sides thereof, the reason is as follows. For example, in case that alloy powder is melted and the sheet member of suction and exhaust valve in an engine is produced, a feed start position and a feed end position of the powder are mutually superposed, therefore it is necessary to uniform powder amount in the superposed part with the other part. In FIG. 9, the area surrounded by the feed pattern corresponds to the total feed amount of the powder.

Here, at the start of powder feed, it takes, in the conventional control method, the time $T_2$ (more than several seconds) until the actual feed amount reaches to the target feed amount $Q_T$, as shown in FIG. 13. This is due to that feed control of the powder until the actual feed amount reaches to the target feed amount $Q_T$ is conducted by gradually increasing the duty ratio every time that the powder feed is done, thereby the actual feed amount approaches to the target feed amount $Q_T$. On the other hand, in the powder feeder of the first embodiment, it takes only the initial response time $T_1$(shorter than one second) until the actual feed amount reaches to the target feed amount $Q_T$ as shown in FIG. 10. This is realized on the basis that the duty ratio corresponding to the target feed amount is obtained from the calibration curve in FIG. 7(a) as the duty ratio at the start of powder feed, and the powder feed starts according to the obtained duty ratio.

In FIGS. 10, the time T indicates the period (feedback region) during which the feedback control is conducted against the target feed amount $Q_T$. In this feedback region, the momentary actual feed amount is calculated at a timing of the feedback signal on the basis of the output voltage from the load cell, and the duty ratio corresponding to the momentary actual feed amount is obtained from the calibration curve shown in FIG. 7(a), and further the powder is fed according to the obtained duty ratio. Above process is repeated. As a result, the error of the actual feed amount against the target feed amount $Q_T$ in the feedback region T lies within a range of ±2%, thereby the powder can be fed with high accuracy.

In FIGS. 10, the area indicated with diagonals shows the error against the target feed amount $Q_T$. Thus, it is understandable that the powder can be fed with high accuracy and in a short time according to that the above area becomes narrower and narrower.

Figure 10A:
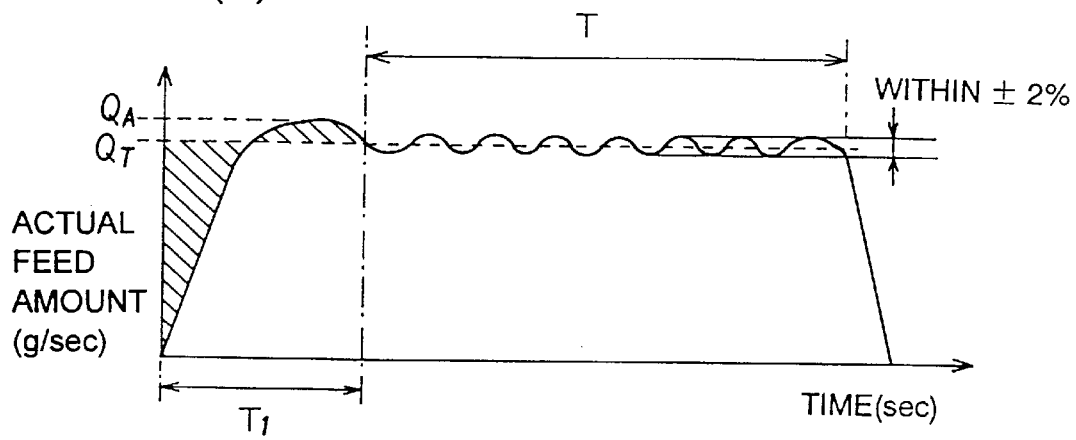
FIG. 10(a) shows a case that the duty ratio at the feed start is bigger than the duty ratio corresponding to the target feed amount.
Figure 10B:
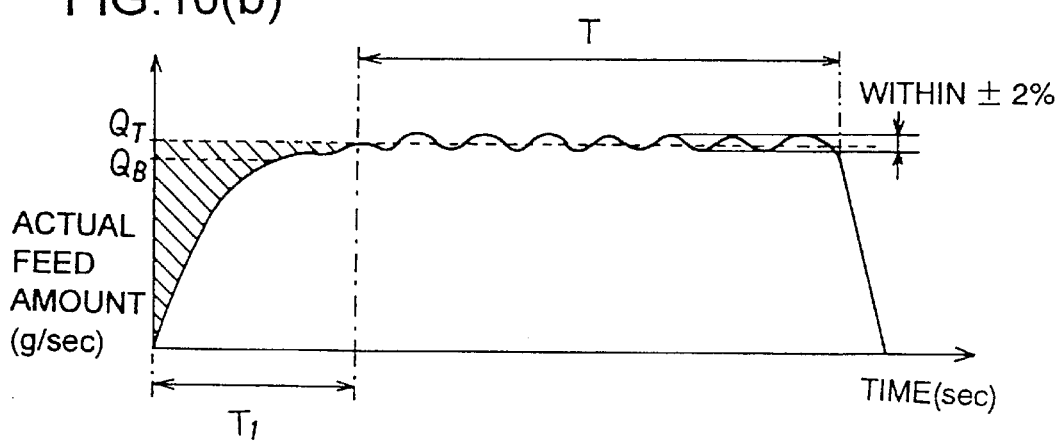
FIG. 10(b) shows a case that the duty ratio at the feed start is smaller than the duty ratio corresponding to the target feed amount.

The control method of the first embodiment will be explained in detail with reference to FIGS. 10(a), 10(b) and 10(c). FIG. 10(a) shows the feed state in a case that the actual feed amount $Q_A$ at the start of powder feel, that is, the actual feed amount obtained from the calibration curve shown in FIG. 7(a) based on the target feed amount $Q_T$ is larger than the target feed amount $Q_T$. This feed state occurs when the points in the relationship between the target feed amount and the duty ratio exist above the calibration curve in FIG. 7(a). Thus, the duty ratio at the start of powder feed becomes bigger than the duty ratio $X_T$ (T=1, 2, 3, ...) which corresponds to the target feed amount $Q_T$ Contrary to the case of FIG. 10(a), FIG. 10(b) shows the feed state in a case that the actual feed amount. $Q_B$ at the start of powder feed is less than the target feed amount $Q_T$.

This feed state occurs when the points in the relationship between the target feed amount and the duty ratio exist under the calibration curve in FIG. 7(a). Thus, the duty ratio at the start of powder feed becomes smaller than the duty ratio $X_T$ (T=1, 2, 3, . . . ) which corresponds to the target feed amount $Q_T$.

Figure 10C:
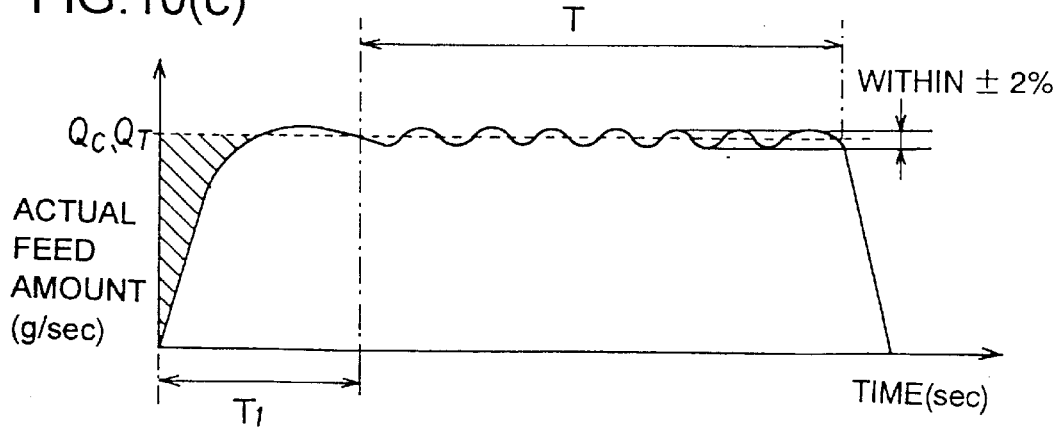
FIG. 10(c) shows a case that the duty ratio at the feed start is equal to the duty ratio corresponding to the target feed amount.

FIG. 10(c) shows the feed state in a case that the actual feed amount $Q_C$ at the start of powder feed is equal to the target feed amount $Q_T$. This feed state occurs when the points in the relationship between the target feed amount and the duty ratio exist on the calibration curve in FIG. 7(a). Thus, the duty ratio at the start of powder feed becomes equal to the duty ratio $X_T$ (T=1, 2, 3, . . . ) which corresponds to the target feed amount $Q_T$.

To approach the feed states shown in FIGS. 10(a), 10(b) to the feed state shown in FIG. 10(c), thereby to control the feed amount of the powder with high accuracy, it is desirable to increase measuring points of the duty ratio $X_1$, $X_2$, . . . in the feeder calibration.

As mentioned above, according to the powder feeder of the first embodiment, the duty ratio $X_T$ corresponding to the target feed amount $Q_T$ is calculated on the basis of the calibration curve obtained by the feeder calibration which is conducted before the start of powder feed, and the powder P starts to be fed according to the duty ratio $X_T$. Therefore, the actual feed amount can reach to the target feed amount $Q_T$ in a short time (within the time $T_1$) from the start of powder feed. Thereby, the powder P can be fed while controlling the actual feed amount with high accuracy, and further the powder P can be precisely fed even in case of the short time feed for several seconds.

The powder feeder according to the second embodiment will be described. The powder feeder of the second embodiment has the same structure as in the first embodiment. The characteristic point of the second embodiment exists on a point that the calibration curve obtained by the feeder calibration is revised every the powder feed time, based on the steady value of the actual feed amount in the feedback region during the previous feed time.

Feed control method of the second embodiment will be described with reference to FIGS. 11, 12. FIG. 11 shows the flowchart when revising process of the calibration curve is conducted and FIG. 12 shows the graph which indicates the control state of the actual feed amount by a relationship between the actual feed amount and time.

In FIG. 11 at first, the feeder calibration process in steps S1–S8 shown in FIG. 6 is conducted in step S14, it is judged in S10 whether the error of the actual feed amount against the target feed amount $Q_T$ lies within a range of ±2% during the present feed time. Or, it is judged whether the time until the feed control is finished is 0.5 seconds or less. If judged "YES" (S10:YES), the steady value of the actual feed amount is stored in the memory and the procedure shifts to S12. On the other hand, if the actual feed amount does not lie within a range of ±2% of the target feed amount $Q_T$ (S10:NO) or if the time until the feed control is finished is more than 0.5 seconds (S10:NO), the powder is fed while conducting the feedback control.

In S12, the revising coefficient is calculated by comparing the actual feed amount obtained in S10 with the steady value of the actual feed amount measured during the first (previous) feed time. Followingly, the calibration curve in FIG. 7(a) obtained from the feeder calibration is revised on the basis of the revising coefficient and the revised calibration curve (shown in FIG. 7(b) or FIG. 7(c) is stored in the memory. Thereafter, the duty ratio is calculated from the revised calibration curve and the duty ratio at the previous feed time is rewritten to the revised duty ratio at the present (second) feed time.

Here, in the third feed time and thereafter, similar to the above, the revising coefficient is calculated by comparing the actual feed amount stored in S10 with the steady value of the actual feed amount obtained in the previous (second) feed time, and the revised calibration curve of FIG. 7(b) or FIG. 7(c), which is revised at the previous (second) feed time, is further revised. Thereafter, the revised calibration curve is stored in the memory. Further, similar to the above, the duty ratio is calculated from the revised calibration curve and the duty ratio at the previous (second) feed time is rewritten to the revised duty ratio at the present (third) feed time. That is, process in S12 corresponds to the coefficient calculation means and the duty ratio calculation means.

After process in S12 is done, it is judged in S13 whether the next powder feed is instructed or not. If judged "YES" (S13: YES), the procedure shifts to S10, thereafter the same processes are conducted through S10–S12. If judged "NO" (S13: NO), the procedure becomes stand-by state in S13 and the feed control terminates under the stand-by condition.

According to the above feed control, the actual feed amount becomes as shown in FIG. 12. That is, the actual feed amount $Q_D$ becomes substantially equal to the target feed amount $Q_T$ at the initial of powder feed. Further, similar to the first embodiment, the duty ratio at the start of powder feed is obtained corresponding to the target feed amount $Q_T$ from the calibration curve (shown in FIG. 7(a), 7(b) or 7(c), and the powder starts to be fed on the basis of the obtained duty ratio. Therefore, it takes only the initial response time $T_1$ (shorter than one second) until the actual feed amount becomes the target feed amount $Q_T$. As a result, as shown in FIG. 12, the error against the target feed amount $Q_T$ becomes small, thereby the powder can be fed with high accuracy at the start of powder feed. After the actual feed amount becomes the target feed amount $Q_T$, the feedback control as in the first embodiment is conducted in the feedback region T, therefore the error of the actual feed amount against the target feed amount $Q_T$ can be held within a range of ±2%, and it is understandable that the powder is precisely fed.

As mentioned above, according to the powder feeder of the second embodiment, the duty ratio $X_T$ corresponding to the target feed amount $Q_T$ is calculated on the basis of the calibration curve obtained by the feeder calibration which is done before use of the powder feeder, and the powder P starts to be fed with the duty ratio $X_T$. Therefore, the actual feed amount can immediately reach to the target feed amount $Q_T$ within the initial response time $T_1$ from the start of powder feed, thereby the powder P can be fed while controlling the actual feed amount with high accuracy and the powder P can be precisely fed even in case of the short time feed for several seconds.

Further, in the second embodiment, the calibration curve obtained by the feeder calibration is revised every feed time on the basis of the steady value of the actual feed amount during the feedback region T in the previous feed time, and the duty ratio $X_T$ corresponding to the target feed amount $Q_T$ is calculated according to the revised calibration curve, thereafter the powder P starts to be fed with the calculated duty ratio $X_T$. Thus, the actual feed amount $Q_D$ can be constantly equal to the target feed amount $Q_T$, thereby the error against the target feed mount $Q_T$ can be made minimum and the powder P can be fed with high accuracy.

Further, the calibration curve is flexibly revised every powder feed, thus it is not necessary to conduct the feeder calibration every feed time even if flow characteristic of the powder changes due to fluctuation in properties or lots of the powder, by conducting the feeder calibration only before the powder feeder is used. Accordingly, it can improve efficiency of powder feed.

While the invention has been particularly shown and described with reference to preferred embodiments thereof, it will be understood by those skilled in the art that the foregoing and other changes in form and details can be made therein without departing from the spirit and scope of the invention.

For example, though in the powder feeders of the first and second embodiments the ultrasonic motor having the piezoelectric element as the drive source is utilized, the present invention can be widely applied for the apparatuses in which it is necessary to precisely control the initial driving of the actuator by the duty ratio. For instance, the present invention can be utilized for output controlling of the ultrasonic processing machine such as the ultrasonic welder used for welding or processing of plastics.

What is claimed is:

1. A control apparatus for a powder feeder which comprises a vibrator having a top end which oscillates with elliptic motion when applied a driving voltage with a resonance frequency, a powder feed path attached to the top end of the vibrator, a powder storing hopper for feeding the powder to the powder feed path, application means for applying the resonance frequency to the vibrator according to a duty ratio, and weight sensor means for detecting a weight of the powder in the powder storing hopper, the control apparatus comprising:

feeder calibration means for conducting feeder calibration before the powder feeder is used;

calibration curve preparing means for preparing a calibration curve based on the feeder calibration and for storing the calibration curve;

duty ratio calculation means for calculating the duty ratio corresponding to a target feed amount which is preset, based on the calibration curve prepared by the calibration curve preparing means; and drive means for starting drive of the vibrator based on the duty ratio calculated by the duty ratio calculation means until a feed amount of the powder reaches to the target feed amount.

2. The control apparatus according to claim 1, wherein the vibrator comprises an ultrasonic motor.

3. The control apparatus according to claim 1, wherein the powder path comprises a powder feed pipe formed of nylon tube.

4. The control apparatus according to claim 2, wherein the resonance frequency is set to approximately 29.4 kHz.

5. The control apparatus according to 2, wherein the weight sensor means comprises a load cell.

6. The control apparatus according to claim 1, wherein the calibration curve is prepared by measuring points of the feed amount per unit time corresponding to more than two values of the duty ratio and thereafter by conducting line interpolation among the points.

7. The control apparatus according to claim 1, wherein it takes several seconds until the feed amount becomes the target feed amount.

8. The control apparatus according to claim 1, further comprising feedback means for feeding back an output signal from the weight sensor means after the feed amount reaches to the target feed amount and feed amount calculation means for calculating a momentary feed amount based on the output signal.

9. The control apparatus according to claim 8, wherein the duty ratio calculation means calculates the duty ratio corresponding to the momentary feed amount based on the calibration curve and the application means applies the resonance frequency to the vibrator according to the calculated duty ratio.

10. The control apparatus according to claim 9, wherein an error of the momentary feed amount lies within a range of ±2% against the target feed amount during a feedback control region.

11. A control apparatus for a powder feeder which comprises a vibrator having a top end which oscillates with elliptic motion when applied a driving voltage with a resonance frequency, a powder feed path attached to the top end of the vibrator, a powder storing hopper for feeding the powder to the powder feed path, application means for applying the resonance frequency to the vibrator according to a duty ratio, and weight sensor means for detecting a weight of the powder in the powder storing hopper, the control apparatus controlling the powder feeder in an initial feed control region and a feedback control region after the initial control region, the control apparatus comprising:

feeder calibration means for conducting feeder calibration before the powder feeder is used;

calibration curve preparing means for preparing a calibration curve based on the feeder calibration and for storing the calibration curve;

measurement means for measuring a steady value of a feed amount in the feedback control region at the previous feed time;

coefficient calculation means for calculating a revising coefficient by comparing the steady value with a feed amount at the present feed time;

revising means for revising the calibration curve according to the revising coefficient;

duty ratio calculation means for calculating the duty ratio corresponding to a target feed amount which is preset, based on the revised calibration curve by the revising means; and drive means for starting drive of the vibrator based on the duty ratio calculated by the duty ratio calculation means until the feed amount of the powder reaches to the target feed amount.

12. The control apparatus according to claim 11, wherein the calibration curve is prepared by measuring points of the feed amount per unit time corresponding to more than two values of the duty ratio and thereafter by conducting line interpolation among the points.

13. The control apparatus according to claim 11, wherein it takes several seconds until the feed amount becomes the target feed amount.

14. The control apparatus according to claim 11, further comprising feedback means for feeding back an output signal from the weight sensor means after the feed amount reaches to the target feed amount and feed amount calculation means for calculating a momentary feed amount based on the output signal.

15. The control apparatus according to claim 14, wherein the duty ratio calculation means calculates the duty ratio corresponding to the momentary feed amount based on the revised calibration curve and the application means applies the resonance frequency to the vibrator according to the calculated duty ratio.

16. The control apparatus according to claim 14, wherein an error of the momentary feed amount lies within a range of ±2% against the target feed amount during a feedback control region.

* * * * *